(12) United States Patent
England (10) Patent No.: US 9,840,221 B2
(45) Date of Patent: Dec. 12, 2017

(54) GRAB HANDLE BRACKET (71) Applicant: FORD GLOBAL TECHNOLOGIES, LLC, Dearborn, MI (US)

(72) Inventor: Martin England, Benfleet (GB)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/145,307

(22) Filed: May 3, 2016

(65) Prior Publication Data

US 2016/0332593 A1 Nov. 17, 2016

(30) Foreign Application Priority Data

May 14, 2015 (GB) .................................. 1508226.6

(51) Int. Cl.
*B60R 21/213* (2011.01)
*B60N 3/02* (2006.01)
*B60R 21/215* (2011.01)
*B60R 21/232* (2011.01)
*B62D 25/04* (2006.01)

(52) U.S. Cl.
CPC ............ *B60R 21/213* (2013.01); *B60N 3/023* (2013.01); *B60N 3/026* (2013.01); *B60R 21/215* (2013.01); *B60R 21/232* (2013.01); *B62D 25/04* (2013.01)

(58) Field of Classification Search
CPC combination set(s) only.
See application file for complete search history.

(56) References Cited

U.S. PATENT DOCUMENTS

| 6,340,169 B1* | 1/2002 | Tietze | B60N 3/02 280/728.2 |
| 6,364,343 B1* | 4/2002 | Slota | B60N 3/02 280/728.2 |
| 6,685,257 B1* | 2/2004 | Beland | B60N 3/026 280/728.1 |
| 7,100,939 B2* | 9/2006 | Blake, III | B60R 21/232 280/728.2 |
| 7,735,853 B2* | 6/2010 | Fink | B60R 21/213 280/728.2 |

(Continued)

FOREIGN PATENT DOCUMENTS

| CN | 201951311 | 8/2011 |
| CN | 202413542 | 9/2012 |

(Continued)

*Primary Examiner* — Darlene P Condra
(74) *Attorney, Agent, or Firm* — Jason Rogers; Price Heneveld LLP (57) ABSTRACT

An A-pillar grab handle attachment bracket configured to connect a grab handle to an A-pillar structure of a motor vehicle is disclosed. The bracket comprises a first flange, a second flange, and a body portion connecting the first and second flanges. The first flange is configured to couple to the grab handle and the second flange is configured to couple to the A-pillar structure of the motor vehicle. The first and second flanges are spaced apart and the body portion extends between the first and second flanges and at least partially defines a channel configured to receive an inflatable portion of a side air curtain bag of the motor vehicle, such that the inflatable portion of the airbag deploys through an open side of the channel between the first and second flanges.

18 Claims, 6 Drawing Sheets

(56) References Cited

U.S. PATENT DOCUMENTS

| | | | |
|---|---|---|---|
| 8,297,674 B2* | 10/2012 | She | B60R 13/025 |
| | | | 296/1.02 |
| 9,376,080 B1* | 6/2016 | Martinez | B60R 13/025 |
| 9,573,550 B1* | 2/2017 | Mitchell | B60R 21/213 |
| 2005/0173902 A1* | 8/2005 | Boxey | B60R 21/2171 |
| | | | 280/730.2 |
| 2007/0080524 A1* | 4/2007 | Kim | B60R 11/0223 |
| | | | 280/730.2 |
| 2007/0267884 A1* | 11/2007 | Failla | B60N 3/026 |
| | | | 296/1.02 |
| 2008/0001384 A1* | 1/2008 | Catron | B60R 13/025 |
| | | | 280/730.2 |
| 2008/0111395 A1* | 5/2008 | Longwell | B60R 13/0206 |
| | | | 296/187.05 |
| 2011/0221170 A1* | 9/2011 | Thurston | B60R 13/0206 |
| | | | 280/728.1 |
| 2011/0221172 A1* | 9/2011 | She | B29C 70/74 |
| | | | 280/730.2 |
| 2011/0291435 A1* | 12/2011 | Matusko | B60N 3/026 |
| | | | 296/1.02 |
| 2013/0119648 A1 | 5/2013 | Nakamura et al. | |

FOREIGN PATENT DOCUMENTS

| | | |
|---|---|---|
| EP | 2 596 996 | 5/2013 |
| JP | 2004231147 | 8/2004 |
| WO | 2014077127 | 5/2014 |

* cited by examiner

GRAB HANDLE BRACKET

RELATED APPLICATION

This application claims the benefit under 35 U.S.C. §119 (b) of United Kingdom Patent Application No. 1508226.6 filed May 14, 2015, entitled "A Grab Handle Bracket," the entire contents thereof being incorporated herein by reference.

FIELD OF THE INVENTION

The present disclosure relates to an A-pillar grab handle attachment bracket for a motor vehicle and is particularly, although not exclusively, concerned with an A-pillar grab handle attachment bracket of a vehicle, wherein the vehicle comprises a side air curtain bag.

BACKGROUND OF THE INVENTION

It is desirable to provide a grab handle on the A-pillar of a motor vehicle to provide a gripping location for passengers entering or exiting the vehicle. Passengers may exert large forces on the grab handle as they enter or exit the vehicle, particularly when the vehicle has a high ride height. The grab handle may couple directly to the structure of the A-pillar to allow forces applied to the grab handle to be transferred directly in to the vehicle structure.

Many modern vehicles are equipped with side air curtain bags, which can be deployed during a collision to extending over a portion of the door and cushion an impact between a passenger of the vehicle and the door.

The grab handle must be placed in a suitable position so that it does not interfere with the deployment of the side air curtain bag. However, in some cases it may be desirable to include a grab handle in a location where an inflatable portion of the side air curtain bag is present.

SUMMARY OF THE INVENTION

According to a first aspect of the present disclosure, there is provided an A-pillar grab handle attachment bracket configured to connect a grab handle to an A-pillar structure of a motor vehicle, the bracket comprising a first flange, a second flange, and a body portion connecting the first and second flanges. The first flange is configured to couple to the grab handle and the second flange is configured to couple to the A-pillar structure of the motor vehicle. The first and second flanges are spaced apart, and the body portion extends between the first and second flanges and at least partially defines a channel configured to receive an inflatable portion of a side air curtain (SAC) bag of the motor vehicle, such that the inflatable portion of the airbag deploys through an open side of the channel between the first and second flanges.

The bracket may comprise one or more stiffening features. For example, the first and/or second flange may comprise one or more stiffening features. Additionally or alternatively, the body portion may comprise one or more stiffening features. The stiffening features provided on the body portion may extend at least partially between the first and second flanges and may protrude from a surface of the body portion.

The stiffening features on the first and/or second flange may be aligned, e.g., substantially fully aligned, with the stiffening features on the body portion. Additionally or alternatively the stiffening features on the first and/or second flange may not be aligned, e.g., not substantially fully aligned with the stiffening features on the body portion.

The stiffening features, e.g., walls forming the stiffening features, may extend in a direction with a component in a plane perpendicular to first and second planes defined by the first and second flanges respectively. The stiffening features may be configured to increase a second moment of area of the bracket to resist deflection, e.g., bending, of the first flange relative to the second flange.

The stiffening features may comprise corrugations or swages. Ridges and troughs of the corrugations/swages may extend in a direction perpendicular, e.g., substantially perpendicular, to a longitudinal axis of the channel. The stiffening features may additionally or alternatively comprise fins or webs. Such fins or webs may also extend in a direction perpendicular, e.g., substantially perpendicular, to a longitudinal axis of the channel.

The bottoms of the corrugations may at least partially define the channel. The first and/or second flange may at least partially define a side wall of the channel. The channel may be substantially U-shaped. The width of the channel may be at least 40 mm, e.g., the first and second flanges may be spaced apart by at least 40 mm.

A first plane defined by the first flange may not be parallel to a second plane defined by the second flange, e.g., the first and second flanges may be provided with an angular offset between each other. The first plane may be provided at an angle of at least 45°, e.g., preferably approximately 80°, from the second flange. The angular offset may allow the grab handle to be provided in an ergonomically defined position and/or a position that does not cause a visual obstruction to a driver of the vehicle.

The body portion may be configured to contact the side air curtain bag at least partially along the length of the body portion. For example, the bottoms of the corrugations of the body portion may contact the side air curtain bag. The body portion may be configured such that it does not contact the side air curtain bag along the full length of the body portion, e.g., in order that it does not obstruct the deployment of the side curtain airbag through the open side of the channel between the first and second flanges.

The attachment bracket may be formed from a material with a greater stiffness, e.g., a greater Young's modules, than the material of a layer of the A-pillar structure to which the bracket is coupled.

The second flange may comprise two or more, e.g., three or more, apertures. The second flange may be coupled to the A-pillar structure by fasteners passing through the apertures. The body portion may comprise an opening for accessing one of the apertures, e.g., an aperture between ends of the second flange. One or more of the apertures may be provided at ends of the second flange. Ends of the second flange may extend beyond the body portion, e.g., the second flange may be longer than the body portion.

According to another aspect of the present disclosure, there is provided an A-pillar grab handle attachment assembly, the assembly comprising: the attachment bracket according to a previously mentioned aspect of the disclosure.

The assembly may further comprise: the A-pillar structure. Additionally or alternatively, the assembly may further comprise: the grab handle. Again additionally or alternatively, the assembly may further comprise: the side air curtain bag. The side air curtain bag may comprise an inflatable portion at least partially surrounded by the body portion of the attachment bracket. The inflatable portion may be configured to be deployed between the first and second flanges of the attachment bracket.

The assembly may further comprise: an A-pillar reinforcement member coupled to the A-pillar structure. The A-pillar reinforcement member may be configured to resist deflections of the A-pillar structure due to loads applied to the grab handle.

The A-pillar reinforcement member may comprise one or more tabs. The A-pillar reinforcement member may be coupled to the A-pillar structure at the tabs. For example, the tabs may be welded to the A-pillar structure. The tabs may be received in recesses of the A-pillar structure.

The attachment bracket may be coupled to the A-pillar structure by one or more fasteners. The fasteners may pass through apertures formed in the A-pillar reinforcement member.

The A-pillar reinforcement member may be formed from a material with a greater stiffness, e.g., a greater Young's modulus, than the material of a layer of the A-pillar structure to which the reinforcement member is coupled.

The A-pillar reinforcement member may be configured to transfer load from the attachment bracket into the A-pillar structure, e.g., into a flange of the A-pillar structure.

The A-pillar reinforcement member may be provided on the opposite side of the A-pillar structure to the attachment bracket.

According to another aspect of the present disclosure, there is provided an A-pillar reinforcement member suitable for use within the A-pillar grab handle attachment assembly according to a previously mentioned aspect of the disclosure.

According to another aspect of the present disclosure, there is provided a vehicle comprising the attachment bracket according to a previously mentioned aspect of the disclosure, the A-pillar grab handle attachment assembly according to a previously mentioned aspect of the disclosure, or the A-pillar reinforcement member according to a previously mentioned aspect of the disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to shown more clearly how it may be carried into effect, reference will now be made, by way of example, to the accompanying drawings, in which.

DETAILED DESCRIPTION OF THE PREFERRED EMBODIMENTS

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
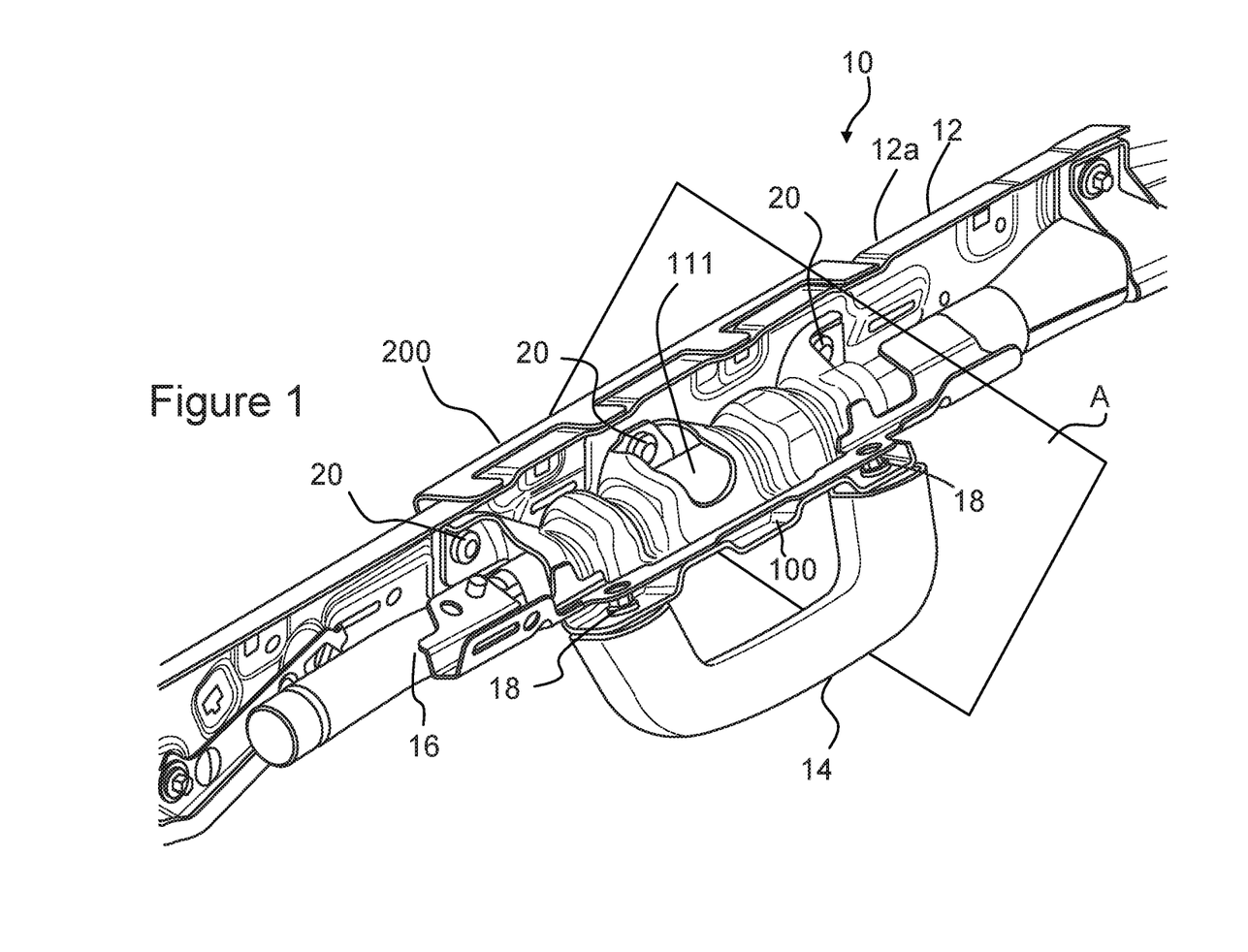
FIG. 1 is a perspective view of an A-pillar assembly, according to an embodiment of the present disclosure.

With reference to FIG. 1, an A-pillar assembly 10 of a vehicle, e.g., a motor vehicle, may comprise an A-pillar 12, an attachment bracket 100, an A-pillar reinforcement member 200, a grab handle 14 and a side air curtain (SAC) bag 16. The A-pillar 12 refers to either one of two support posts that are positioned on either side of the windshield of a vehicle and connect the roof to the body.

Figure 3:
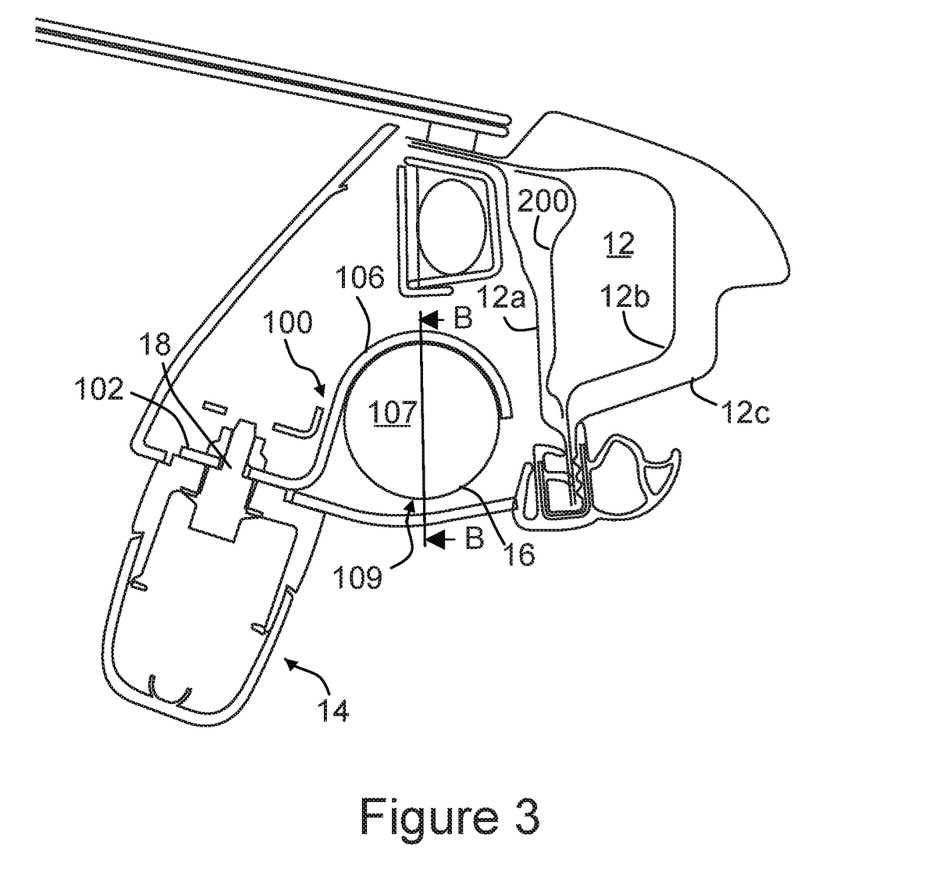
FIG. 3 is a cross section of the A-pillar assembly shown in FIG. 1, on plane A.

With reference to FIG. 3, the A-pillar 12 of the vehicle may comprise any number of layers, such as an inner layer 12a, a hardened impact layer 12b and an outer body panel layer 12c. However, the present disclosure may be applied to an A-pillar with any number of layers arranged in any order. The attachment bracket 100 and/or the reinforcement member 200 may be coupled to one or more of the A-pillar layers. In the particular example depicted, the attachment bracket 100 and the reinforcement member 200 are attached to the inner layer 12a.

The attachment bracket 100 may be coupled to the A-pillar 12 by one or more fasteners 20. Alternatively, the attachment bracket may be welded or brazed or coupled to the A-pillar 12 using any other permanent or temporary coupling method. The grab handle 14 may be coupled to the attachment bracket 100 by one or more fasteners 18 or by any other method.

As shown in FIG. 1, the reinforcement member 200 may be coupled to the opposite side of the A-pillar layer 12a from the attachment bracket 100. In the arrangement shown in FIG. 1, the reinforcement member 200 has been coupled to the A-pillar using a welding process, however it is equally envisaged that the reinforcement bracket 200 may be coupled to the A-pillar using fasteners, such as bolts or rivets, or another temporary or permanent coupling method.

Figure 2A:
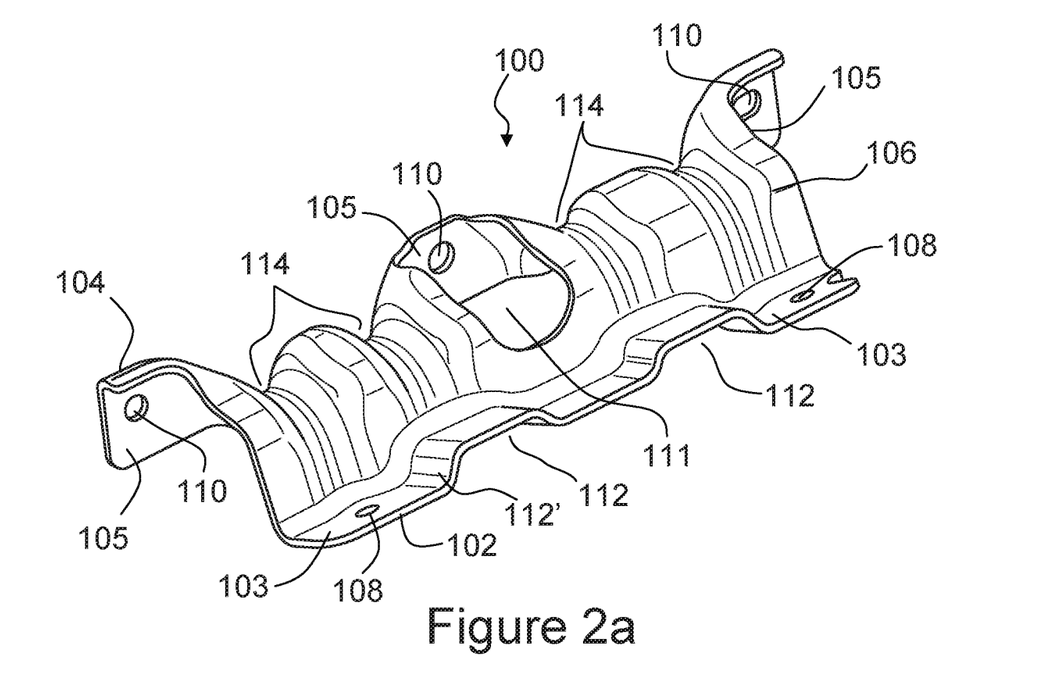
FIG. 2a is a perspective front view of an attachment bracket, according to an embodiment of the present disclosure.
Figure 2B:
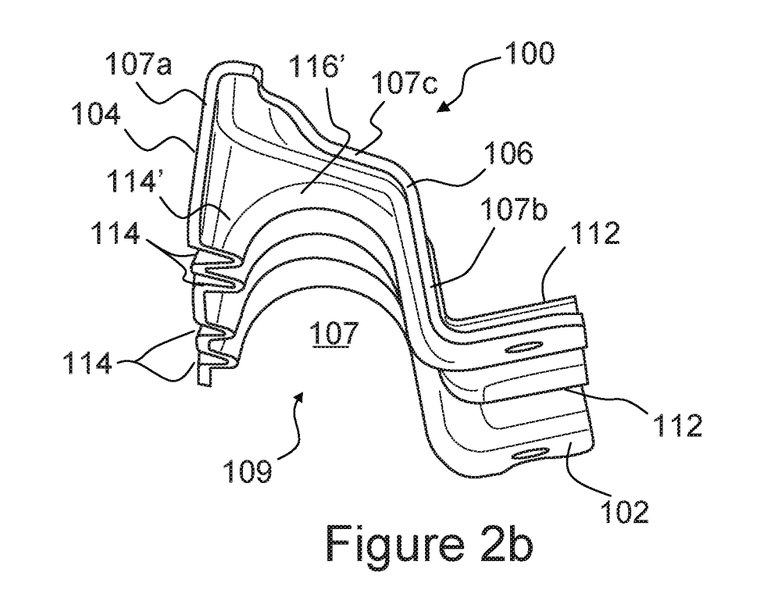
FIG. 2b is a perspective side view of an attachment bracket, according to an embodiment of the present disclosure.

With reference to FIGS. 2a and 2b, the attachment bracket 100 is described in greater detail. The attachment bracket may comprise a first flange 102, a second flange 104 and a body portion 106 connecting the first and second flanges 102, 104.

The first flange 102 may comprise one or more first mounting points 103. The first flange 102 may be configured to couple to the grab handle 14 at the first mounting points 103. For example, as shown in FIG. 2a, the first flange 102 may comprise two mounting points 103, with one at each end of the first flange 102. The mounting points 103 may comprise one or more apertures 108, which allow the grab handle 14 to be coupled to the attachment bracket 100 using fasteners passed through the apertures 108.

The second flange 104 may comprise one or more second mounting points 105. The second flange 104 may be configured to couple the bracket to the A-pillar 12 at the second mounting points 105. For example, as shown in FIG. 2a, the second flange 104 may comprise three second mounting points 105, with one at each end of the second flange 104 and one therebetween. The mounting points 105 may comprise one or more apertures 110. As shown in FIG. 1, the attachment bracket 100 may be coupled to the A-pillar 12 using fasteners 20 passed though the apertures 110. The attachment bracket 100 may comprise one or more openings or clearance gaps 111, e.g., provided in the body portion 106, to allow access to the mounting points 105, in particular the intermediate mounting point. For example, the clearance gaps 111 may provide access for a tool to be used to tighten one or more of the fasteners 20. The mounting points 105 at the ends of the second flange 104 may otherwise extend beyond the body portion so as to facilitate access.

The first and second flanges 102, 104 may be spaced apart from one other. For example, the first and second flanges 102, 104 may be spaced apart by a distance sufficient to accommodate the side air curtain bag 16, e.g., by 40 mm or more. Configuring the bracket such that the first and second flanges 102, 104 are spaced apart may allow the side air curtain bag 16 to be installed in a position between the first and second flanges 102, 104, as shown in FIG. 1.

Additionally or alternatively, the first and second flanges 102, 104 may be provided at an angular offset from one another. In other words, a first plane defined by the first flange 102 may not be parallel with a second plane defined by the second flange 104. The first flange 102 may be provided at an angular offset of 45° or more from the second flange 104. For example, as shown in FIGS. 1, 2a, and 2b, the first flange 102 may be provided at an angular offset of approximately 80° from the second flange 104.

Providing the first flange 102 at an angular offset from the second flange 104 may allow the grab handle 14 to be provided in an ergonomic location on the vehicle and/or may allow the grab handle 14 to be provided such that it does not obstruct the vision of a driver of the vehicle around the A-pillar.

The body portion 106 of the attachment bracket 100 may extend between the first and second flanges 102, 104. As shown in FIGS. 2b and 3, the body portion may at least partially define a channel 107 in which a portion of the side air curtain bag 16 may be received, e.g., an inflatable portion of the side air curtain bag. The channel 107 may at least partially surround the portion of the side air curtain bag 16. The channel 107 may have an open side 109, e.g., the channel 107 may be substantially U-shaped. The attachment bracket 100 may therefore allow the inflatable portion of the side air curtain bag 16 to deploy through the open side 109 of the channel 107 between the first and second flanges 102, 104.

As shown in FIGS. 2a and 2b, the channel 107 may be at least partially formed by the second flange 104 with the second flange 104 forming a side wall 107a of the channel. The body portion 106 otherwise forms the opposite channel side wall 107b and a connecting wall 107c at the bottom of the channel. The first flange 102 connects to the channel side wall 107b at the top of the channel 107. In an alternative arrangement, not shown, the channel may be at least partially formed by the first flange 102. This may be in addition to, or as an alternative to, the channel 107 being at least partially formed by the second flange 104.

The first flange 102 and/or the second flange 104 may comprise one or more stiffening features. As shown in FIGS. 2a and 2b, the stiffening features may comprise one or more corrugations 112, 114, however, it is equally envisaged that the stiffening features may comprise walls, fins, ribs, webs or any other feature, which increases the stiffness of the attachment bracket 100. Additionally or alternatively, the body portion 106 may comprise one or more stiffening features, such as corrugations 116. The corrugations 112, 114, 116 may be configured to increase a second moment of area of the bracket to resist bending of the bracket that would result in the first flange 102 being deflected relative to the second flange 104.

As depicted, ridges and troughs of the corrugations 112, 114, 116 may extend in a direction perpendicular to a longitudinal axis of the channel 107 (and thus the side air curtain bag 16). The corrugations 112, 114, 116 may comprise walls 112', 114', 116' between the ridges and troughs. The walls 112', 114', 116' may extend in a direction with a component in a plane perpendicular to the first plane defined by the first flange 102, and a second plane defined by the second flange 104.

As shown in FIGS. 2a and 2b, the corrugations 116 may extend substantially fully along the body portion 106 between the first and second flanges 102, 104. Alternatively, the corrugations 116 may extend at least partially over the body portion 106 between the first and second flanges 102, 104.

In the arrangement shown in FIGS. 2a and 2b, the corrugations 116 provided on the body portion 106, are substantially aligned, e.g., fully aligned, with the corrugations 114 provided on the second flange 104. In other words, the corrugations 116 may extend over the second flange 104 to form the corrugations 114. By contrast, in the depicted arrangement, the corrugations 116 provided on the body portion 106, are not aligned with the corrugations 112 provided on the first flange 102. In an alternative arrangement (not shown), the corrugations 116 provided on the body portion 106, may be substantially aligned with the corrugations 112 provided on the first flange 102. In this alternative arrangement, the corrugations 114 provided on the second flange 104 may or may not be substantially fully aligned with the corrugations 116 provided on the body portion 106. In another alternative arrangement, not shown, the corrugations 112, 114, 116 may not be substantially fully aligned with any others of the corrugations.

As shown in FIGS. 1, 2a, and 2b, due to the presence of the corrugations 112, 114, the first and/or second flange 102, 104 may be discontinuous between the mounting points 103, 105.

The attachment bracket 100 may be formed from a material with a greater stiffness (e.g., greater Young's modulus) than the A-pillar layer to which it attaches, e.g., the inner layer 12a. For example, the attachment bracket 100 may be made from a high strength steel and the A-pillar inner layer 12a may be made from a lower strength steel.

The use of the higher stiffness material to form the attachment bracket 100 and/or the provision and arrangement of the corrugations 112, 114, 115, may allow the attachment bracket to withstand a large load, e.g., 1000N, being applied to the grab handle 14 despite the offset between the first and second flanges 102, 104.

Figure 4:
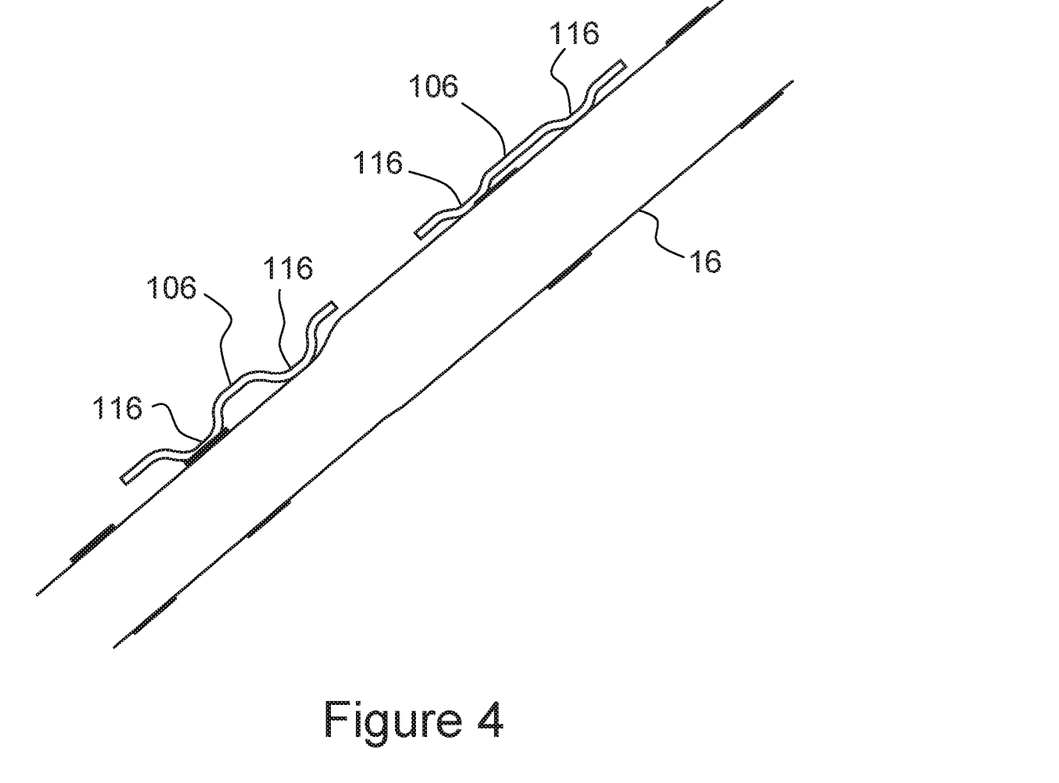
FIG. 4 is a cross section of the A-pillar assembly shown in FIG. 3, on line B-B.

As shown in FIG. 4, the body portion 106 may be in contact with the side air curtain bag 16 at least partially along the length of the body portion, e.g., at the corrugation troughs. However, the body portion 106 may not be in contact with the side air curtain bag 16 along the full length of the body portion. For example, only the troughs of the corrugations 114, 116 may contact the side air curtain bag 16. This minimal contact may avoid any interference with the deployment of the SAC bag 16.

Referring still to FIG. 4, the troughs of corrugations 114, 116 may be deeper at one end of the bracket 100. This may account for a varying diameter of the folded side air curtain bag 16. The side air curtain bag 16 may require less material at one end (e.g., a dashboard end) due to the A-pillar 12 being angled relative to the body of the vehicle. Accordingly, deeper corrugations 114, 116 may be provided towards one end of the bracket 100.

Figure 5:
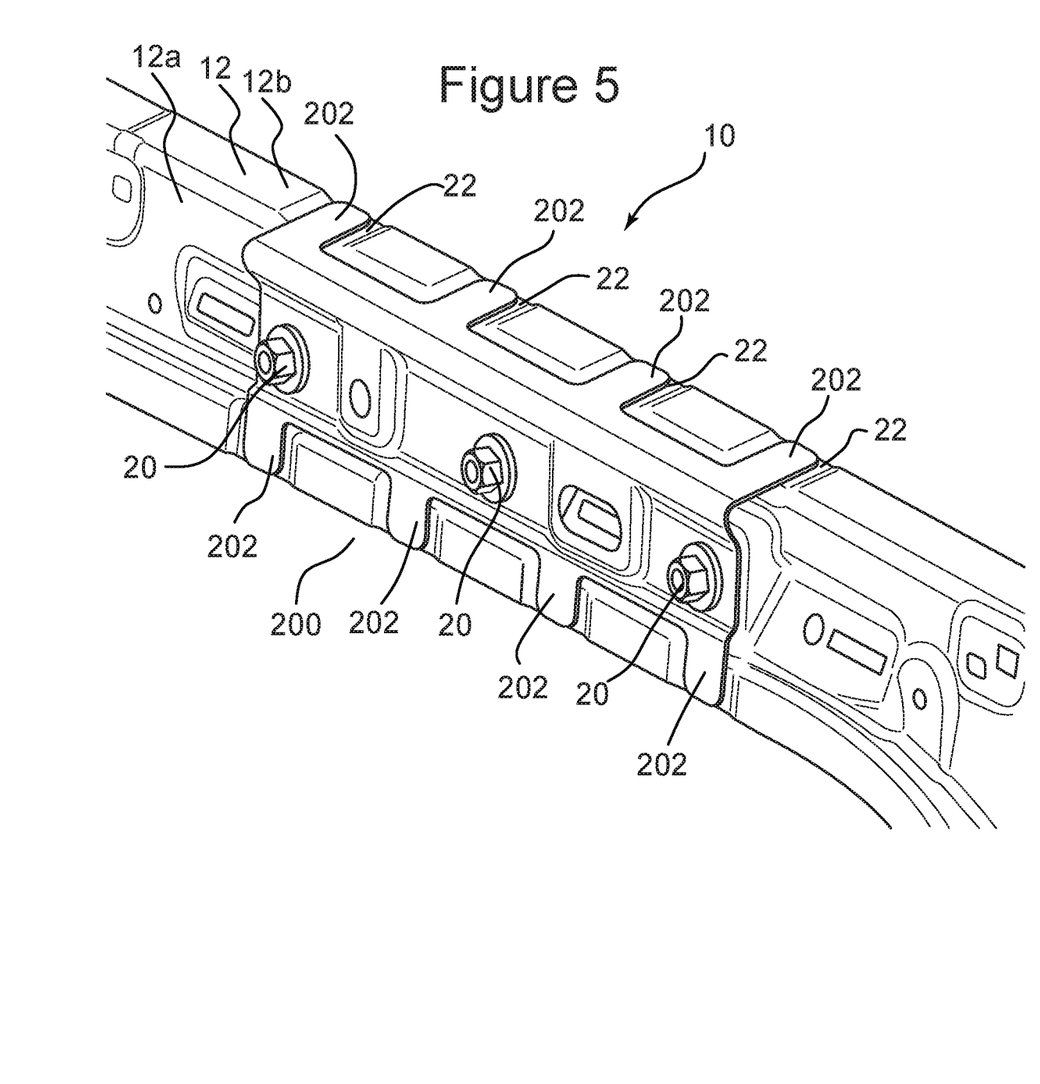
FIG. 5 is a perspective rear view of an A-pillar assembly, according to an embodiment of the present disclosure.

With reference to FIG. 5, the reinforcement member 200 may comprise a plurality of tabs 202. The tabs 202 may be distributed along the length of the reinforcement member 200. As depicted, the tabs 202 may be provided on both longitudinally extending edges of the reinforcement member 200, although they may only be provided along one edge. In the arrangement depicted, there are four tabs provided along each edge. The tabs 202 may extend in a direction perpendicular to a longitudinal axis of the reinforcement member 200 and A-pillar 12.

The reinforcement member 200 may be bent along a line parallel to the longitudinal axis of the reinforcement member 200 and A-pillar 12. The reinforcement member 200 may thus extend over a surface 12a and flange 12b of the A-pillar 16. Tabs 202 on one edge of the reinforcement member 200 may engage the A-pillar surface 12a and tabs 202 on the other edge of the reinforcement member 200 may engage the A-pillar flange 12b. Tabs 202 on opposite edges of the reinforcement member 200 may thus be angled with respect to each other.

The tabs 202 may be received within corresponding pockets or recesses 22 formed in the A-pillar 12, e.g., inner layer 12a. The reinforcement member 200 may be welded to the A-pillar at the tabs 202. The tabs may therefore increase an available weld length between the reinforcement member 200 and the A-pillar 12 and allow for improved coupling between the reinforcement member 200 and the A-pillar 12.

Figure 6:
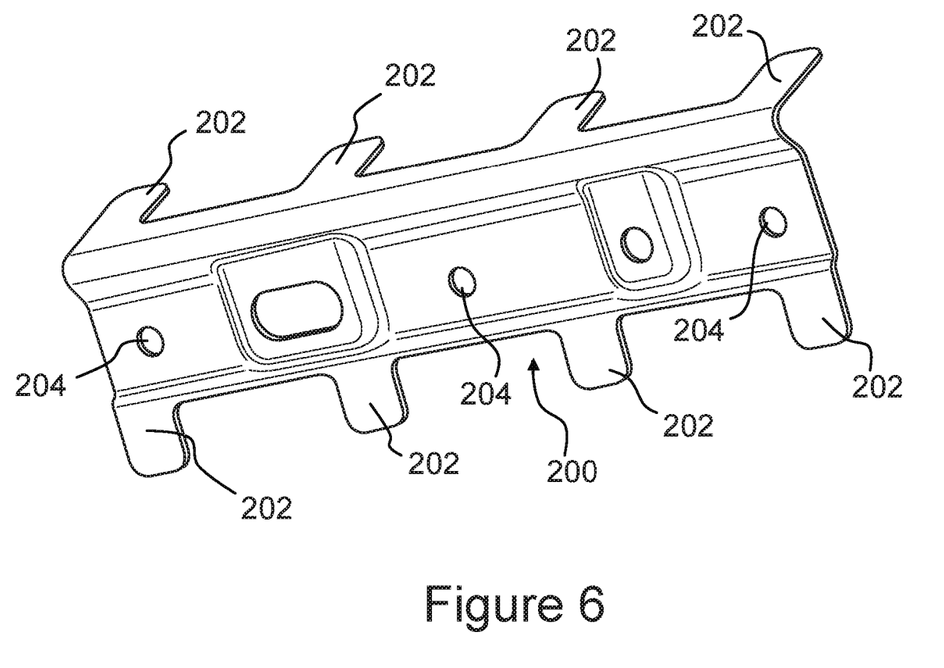
FIG. 6 is a perspective view of an A-pillar reinforcement member, according to an embodiment of the present disclosure.

As shown in FIG. 6, the reinforcement member 200 may comprise one or more apertures 204. The apertures 204 may be configured to align with the apertures 110 provided in the second flange 104 of the attachment bracket 100, when both components are assembled into the A-pillar assembly. When the attachment bracket 100 is coupled to the A-pillar 12 using the fasteners 20, as shown in FIG. 1, the fasteners 20 may also pass through the apertures 204 in the reinforcement member 200.

The reinforcement member 200 may be formed from a material with a greater stiffness (e.g., greater Young's modulus) than the A-pillar layer to which it attaches, e.g., the inner layer 12a. For example, the reinforcement member 200 may be made from a high strength steel and the A-pillar inner layer 12a may be made from a lower strength steel.

The reinforcement member 200 may be configured to transfer load from the attachment bracket 100 into the A-pillar 12, for example, into the flange of the A-pillar. The reinforcement member may allow the load to be spread over a greater portion of the A-pillar 12 than it would be otherwise.

The reinforcement member 200 may be configured to resist deflections of the A-pillar. For example the reinforcement member 200 may resist deflections of the A-pillar 12 due to loads applied to the grab handle 14 by a passenger of the vehicle, which are transmitted to the A-pillar 12 through the attachment bracket 100.

The reinforcement member 200 may however be omitted. For example, the pillar 12 may be increased in thickness, e.g., in the region of the bracket 100.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An A-pillar grab handle attachment bracket comprising: a first flange, a second flange, and a body portion connecting the first and second flanges, the first flange adapted to couple to a grab handle and the second flange adapted to couple to an A-pillar structure of a motor vehicle;

wherein the first and second flanges are spaced apart, and the body portion extends between the first and second flanges and comprises a corrugation having walls that at least partially define a substantially arcuate and concave U-shaped channel adapted to receive an inflatable portion of a side air curtain bag of the motor vehicle, such that the inflatable portion of the side air curtain bag deploys through an open side of the substantially U-shaped channel between the first and second flanges, and wherein one of the first or second flanges form a side wall of the channel.

2. The attachment bracket according to claim 1, wherein the bracket comprises one or more stiffening features and the body portion corrugation comprises one of said stiffening features.

3. The attachment bracket according to claim 2, wherein at least one of the first and second flanges comprises one or more stiffening features.

4. The attachment bracket according to claim 3, wherein one of the stiffening features is disposed on the second flange and comprises a corrugation that is aligned with the body portion corrugation.

5. The attachment bracket according to claim 4, wherein one of the body portion corrugations or the second flange corrugation comprise a ridge and a trough that extends in a direction substantially perpendicular to a longitudinal axis of the substantially arcuate and concave U-shaped channel.

6. The attachment bracket according to claim 2, wherein the stiffening features increase a second moment of area of the bracket to resist deflection of the first flange relative to the second flange.

7. An attachment bracket comprising a first flange coupled to a handle, a second flange spaced apart from the first flange and coupled to an A-pillar structure, and a body portion connecting the first and second flanges and extending therebetween and comprising a corrugation having walls that at least partially define a substantially arcuate and concave U-shaped channel receiving an inflatable portion of an airbag, wherein the inflatable portion of the airbag deploys through an open side of the substantially arcuate and concave U-shaped channel between the first and second flanges.

8. The attachment bracket according to claim 7, wherein at least one of the first and second flanges at least partially define a side wall of the substantially arcuate and concave U-shaped channel.

9. The attachment bracket according claim 7, wherein the attachment bracket is formed from a material with a greater stiffness than a material of a layer of the A-pillar structure to which the bracket is coupled.

10. The attachment bracket according to claim 7, wherein the second flange comprises three or more apertures, and wherein the second flange is coupled to the A-pillar structure by fasteners passing through the apertures and the body portion comprises an opening for accessing one of the apertures.

11. An A-pillar assembly comprising a grab handle, an A-pillar structure, a bracket, and a side air curtain bag of the motor vehicle, the bracket further comprising a first flange coupled to the grab handle, a second flange coupled to the A-pillar structure, and a body portion connecting the first and second flanges, wherein the first and second flanges are spaced apart, and the body portion extends between the first and second flanges and comprises a corrugation having walls that at least partially define a substantially arcuate and concave U-shaped channel configured to receive the airbag, such that the inflatable portion of the airbag deploys through an open side of the substantially arcuate and concave U-shaped channel between the first and second flanges.

12. The A-pillar assembly according to claim 11, wherein the assembly further comprises an A-pillar reinforcement member coupled to the A-pillar structure, wherein the A-pillar reinforcement member is configured to resist deflections of the A-pillar structure due to loads applied to the grab handle.

13. The A-pillar assembly according to claim 12, wherein the A-pillar reinforcement member comprises one or more tabs and the A-pillar reinforcement member is coupled to the A-pillar structure at the tabs.

14. The A-pillar assembly according to claim 13, wherein the tabs are received in recesses of the A-pillar structure.

15. The A-pillar assembly according to claim 12, wherein the bracket is coupled to the A-pillar structure by one or more fasteners and the fasteners pass through apertures formed in the A-pillar reinforcement member.

16. The A-pillar assembly according to claim 12, wherein the A-pillar reinforcement member is formed from a material with a greater stiffness than the material of a layer of the A-pillar structure to which the reinforcement member is coupled.

17. The A-pillar assembly according to claim 12, wherein the A-pillar reinforcement member is adapted to transfer load from the bracket into the A-pillar structure.

18. The A-pillar assembly according to claim 12, wherein the A-pillar reinforcement member is provided on the opposite side of the A-pillar structure to the bracket.

* * * * *